United States Patent Office 2,724,713
Patented Nov. 22, 1955

2,724,713

1-CARBOBENZOXYPIPERAZINES AND PROCESS OF PREPARING SAME

Leon Goldman, Nanuet, N. Y., and Richard P. Williams, Westwood, N. J., assignors to American Cyanamid Company, New York, N. Y., a corporation of Maine No Drawing. Application March 24, 1954,
Serial No. 418,456

9 Claims. (Cl. 260—268)

This invention relates to certain new organic compounds. More particularly, this invention relates to 1-carbobenzoxypiperazines having substituents in the 4 position, salts thereof and methods for their preparation.

The new compounds of this invention may be represented by the following structural formula:

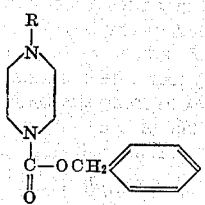

wherein R represents a member selected from the group consisting of lower alkyl, aralkyl and alicyclic radicals—such as for example, methyl, ethyl, propyl, butyl, benzyl, phenethyl, cyclohexyl, and cyclobutyl and salts thereof.

The compounds of this invention are adaptable to a variety of uses in the fields of medicine and organic chemistry. For example, they are useful in preparing unsymmetrically substituted piperazines having substituents on both nitrogen atoms, such as the compounds disclosed in the copending U. S. application, S. N. 411,586, of Goldman and Williams, filed February 19, 1954. This class of piperazines also shows antibacterial and antifungal activity against such microorganisms as *Bacillus subtilis, Staphylococcus aureus, Mycobacterium sp. 607, Sarcina lutea, Salmonella pullorum*. In addition, certain of these compounds exhibit characteristic and well-defined pharmacologic properties as antispasmodics, vasodilators, and sedatives. Other closely related pharmacological and chemical uses may be readily apparent to those skilled in the art and it is intended that these also be included within the scope of the present invention.

While it is not intended that this invention be limited to substituted carbobenzoxypiperazines prepared by any specific process, a particularly convenient method for preparing these compounds has been discovered and it is intended that this new method and its several modifications be included within the scope of this invention. In this new method, various substituents are introduced into the carbobenzoxypiperazine nucleus by alkylation of its secondary amine with an aldehyde or ketone in the presence of formic acid. In this reaction the secondary amine, as represented by the piperazine, reacts directly with the carbonyl groups of the correspondingly substituted aldehyde or ketone, the formic acid operating as the sole reducing agent. Formation of the substituted carbobenzoxypiperazine is accompanied by the evolution of carbon dioxide. The reaction may be represented as follows:

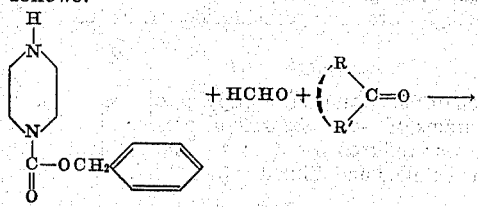

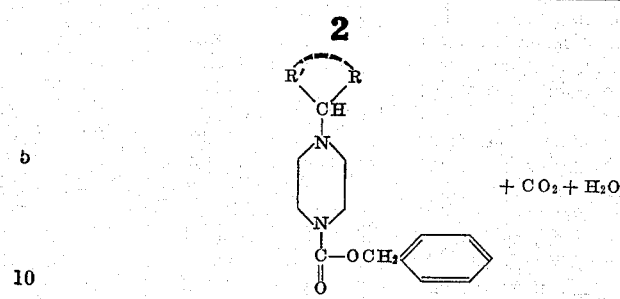

wherein R and R' are members of the group consisting of hydrogen atoms, alkyl radicals, and keto-alkyl functions of an alicyclic ring connected by carbon to carbon bonds to the carbonyl radical.

The function of the formic acid in this reaction is not only that of a reducing agent but also a catalyst and solvent. The reaction is vigorous but proceeds smoothly at temperatures ranging from 70° to 120° C.

Substituents may also be introduced into the carbobenzoxypiperazine ring in the form of aldehydes and ketones employing other reagents in lieu of formic acid for reduction. Good yields are obtained, for example, when zinc-hydrochloric acid is used as the reducing agent. This reaction is suitable for both aldehydes and ketones which are soluble in hydrochloric acid. The time required for reaction is relatively short for aliphatic aldehydes (from 1 to 3 hours), but is considerably longer (up to 5 days) for aromatic aldehydes.

The use of hydrogen-platinum as the reducing catalyst may be also advantageous in introducing various substituents into the carbobenzoxypiperazine ring where formic acid or zinc-hydrochloric acid are unobtainable or undesirable. Both aldehydes and ketones react smoothly with the hydrogen on the carbobenzoxypiperazine nitrogen to yield the corresponding N-substituted product. The reaction proceeds smoothly at room temperature under atmospheric pressure until the theoretical amount of hydrogen is taken up, at which time the catalyst and solvent are removed and the desired compound is further purified.

Substituents may also be introduced in the carbobenzoxypiperazine nucleus in the form of their corresponding p-toluenesulfonate derivatives—as for example, the alkyl p-toluenesulfonates in the presence of an organic solvent. The mixture is refluxed for a period ranging from 12 hours to 5 days until the reaction reaches completion. The resulting p-toluenesulfonate salt of the substituted carbobenzoxypiperazine is soluble in water but practically insoluble in organic solvents. It may be readily converted to the free base by dissolving it in water and adding thereto an alkaline substance such as an alkali metal carbonate—as for example, sodium carbonate or potassium carbonate. A variety of salts may then be readily obtained by treatment of the substituted carbobenzoxypiperazine with the corresponding acid—as for example, hydrochloric, sulfuric, phosphoric, picric, tartaric, oxalic, or citric.

In general it will be found convenient to perform the reaction in an inert organic solvent which is suitable for refluxing—as for example, benzene, toluene, xylene, dimethylformamide or the lower alkyl alcohols such as ethyl, methyl, propyl and the like. The temperature during the refluxing is slightly higher than the boiling point of the solvent used and is equivalent to the boiling point of the reaction mixture.

An alternative and equally convenient method for adding various substituents to the available hydrogen of the carbobenzoxypiperazine nitrogen, is by the reaction of the corresponding alkyl, aralkyl, or alicyclic halide in the presence of a base and a suitable organic solvent. For example benzyl chloride or phenethyl chloride, dissolved in a suitable solvent such as a lower alkyl alcohol, is reacted with the unsubstituted carbobenzoxypiperazine in the presence of an alkali metal hydroxide, carbonate or bicarbonate such as sodium carbonate, sodium hydroxide, potassium bicarbonate, potassium carbonate, potassium hydroxide, or other bases belonging to this class. The reaction will proceed equally as well in the absence of alkali provided an excess of carbobenzoxypiperazine is present in the reaction mixture. The reaction reaches completion smoothly and without difficulty at temperatures ranging from 0° to 50° C. within a period varying from 15 minutes to 5 hours and results in the formation of N-substituted carbobenzoxypiperazines.

Any inert organic solvent is suitable for use in this reaction, its function being not only to dissolve the carbobenzoxypiperazine but also to place the corresponding halide into solution. Examples of suitable solvents for this purpose are solutions of acetone, dioxane and chloroform; the lower alkyl alcohols such as methyl, ethyl, and the like or aqueous mixtures thereof. This method of substitution is particularly suitable when aralkyl radicals are desired on the carbobenzoxypiperazine ring.

In the above reaction where the free base results, the salt is readily obtainable by reacting the base with a corresponding acid, for example, hydrochloric, sulfuric, phosphoric, picric, tartaric, oxalic and citric.

The examples below are intended to illustrate the broad concept of the present invention but are not intended to limit the scope thereof. Many variations and alterations may be made by these skilled in the art without departing from the spirit of the invention. All parts are by weight except as otherwise indicated.

*Example I*

1-carbobenzoxypiperazine, 110.1 grams, was added with shaking and cooling to a solution of 102.4 grams of methyl p-toluenesulfonate in 350 ml. of benzene. The reaction mixture was refluxed for 15 hours. After chilling the mixture, filtration yielded 109 grams of colorless crystals of 1 - carbobenzoxy - 4-methylpiperazinium-p-toluenesulfonate, melting at 130–140° C. The filtrate was evaporated under reduced pressure and the oily residue was crystallized from ethyl acetate, giving an addition 72.5 grams of colorless crystals melting at 120–135° C. The first crop of crystals was recrystallized from ethanol to give colorless crystals melting at 175–175.5° C.

*Example II*

To 65 ml. of 88% formic acid, 110 grams of 1-carbobenzoxypiperazine was added while stirring and cooling to maintain the temperature at 22–28° C. The resulting solution was heated to 80° C., and 61 grams of 37% formaldehyde was added during 15 minutes while maintaining a temperature of 80–85° C. A vigorous evolution of carbon dioxide occurred. The solution was heated to 100° C. for an hour and then distilled until the internal temperature was 200° C. The solution was cooled and made alkaline with 12.5 N sodium hydroxide, and the oil which separated was extracted with either. The ether extract was dried first over sodium hydroxide pellets and then over anhydrous calcium sulfate (Drierite). The extract was then distilled to remove the ether, and the residual liquid was distilled under reduced pressure. After removal of 10 g. of forerun a total of 73.4 g. of colorless liquid, B. P. 140–150° C. (0.3 mm.), was obtained. This fraction was redistilled to yield 71 g. of 1-carbobenzoxy-4-methylpiperazine, a colorless liquid, B. P. 134–141° C. (0.3 mm.).

*Example III*

A mixture of 44 g. of 1-carbobenzoxypiperazine, 48.4 g. of methyl p-toluenesulfonate, 13.8 g. of anhydrous sodium carbonate, and 120 ml. of absolute ethanol was stirred and refluxed for 10 hours. The cooled mixture was filtered to remove the precipitate of sodium p-toluenesulfonate, and the filtrate was evaporated at reduced pressure to remove the ethanol. The residue was dissolved in water and made strongly alkaline with 50% sodium hydroxide. The resulting yellow layer was extracted with ether and chloroform and the combined extracts were washed with aqueous sodium carbonate and then with excess 1 N hydrochloric acid. The hydrochloric acid solution was clarified with diatomaceous earth (Celite) and made alkaline with 50% sodium hydroxide, and the brown oil which separated was extracted into ether. The ether extract was dried over anhydrous calcium sulfate (Drierite) and evaporated at reduced pressure. The residual liquid was distilled in a Claisen flask under reduced pressure and after removal of 3 g. of forerun the product, 1-carbobenzoxy-4-methylpiperazine (10.5 g.), distilled as a colorless liquid at 141–143° C. (0.3 mm.).

*Example IV*

1-carbobenzoxy-4-methylpiperazine, 39.5 g., was dissolved in a small amount of absolute ethanol, and 6N hydrochloric acid was added to give pH 1.5. The mixture was concentrated to dryness under reduced pressure and the residue was taken up in absolute ethanol and again taken to dryness under reduced pressure. The crystalline residue was recrystallized from benzene to give colorless crystals of 1-carbobenzoxy-4-methylpiperazine hydrochloride, M. P. 158–159° C.

*Example V*

A solution of 220 grams (1.0 mole) of 1-carbobenzoxypiperazine and 220 grams (1.1 moles) of ethyl p-toluenesulfonate in 750 ml. of benzene was refluxed for 15 hours. When chilled and filtered the reaction mixture gave 229 grams of colorless crystals, M. P. 144–145° C. Addition of ether to the mother liquor, followed by concentration under reduced pressure, gave an additional 114 grams of colorless crystals, M. P. 138–139° C. When recrystallized from ethanol, colorless crystals of 1-carbobenzoxy-4-ethylpiperazinium p-toluenesulfonate, melting at 147–147.5° C. were obtained.

*Example VI*

A solution of 84.1 grams of 1-carbobenzoxy-4-ethylpiperazinium p-toluenesulfonate in 200 ml. of water was made strongly alkaline (pH 11) by adding 40 ml. of 10 N aqueous sodium hydroxide. This solution was saturated with sodium carbonate and then extracted with benzene. The benzene extract was dried over anhydrous calcium sulfate (Drierite) and then concentrated under reduced pressure, leaving 49.5 grams of 1-carbobenzoxy-4-ethylpiperazine as a residual oil.

*Example VII*

Powdered zinc, 6.5 g., was added to a stirred solution of 12.8 g. of 1-carbobenzoxypiperazine hydrochloride in 250 ml. of water. The mixture was cooled to 10° C. and 3.3 g. of acetaldehyde in 25 ml. of cold water was added during 15 minutes. Then 20 ml. of concentrated hydrochloric acid was added drop-wise with rapid stirring at 10° C. The reaction mixture was stirred at 25° C. for 16 hours and then filtered to remove unreacted zinc. The filtrate was made alkaline with sodium hydroxide and extracted with benzene. After drying over anhydrous calcium sulfate (Drierite) the benzene extract was acidified with 10.5 ml. of 5 N alcoholic hydrogen chloride and concentrated under reduced pressure to one-third volume. Filtration gave 12.5 g. of light yellow crystals of 1-carbobenzoxy-4-ethylpiperazine hydrochloride, M. P. 163–164° C.

*Example VIII*

A solution of 98.5 grams of n-propyl p-toluenesulfonate and 101.3 grams of 1-carbobenzoxypiperazine in 350 ml. of benzene was refluxed for 2 days. The reaction mixture was then chilled and diluted with 600 ml. of absolute ether. Filtration yielded 124.5 grams of a colorless semi-crystalline solid. Recrystallization from benzene-ether gave 76 grams of a colorless solid identified as 1-carbobenzoxy-4-n-propylpiperazinium p-toluenesulfonate, melting at 92–100° C. The mother liquor was diluted with ether, chilled, and filtered to give an additional 24.7 grams of colorless crystals, M. P. 102–107° C.

Example IX

An aqueous solution of 100.7 g. of crude 1-carbobenzoxy-4-n-propylpiperazinium p-toluenesulfonate was adjusted to pH 11 with 4N aqueous sodium hydroxide and extracted with benzene. The benzene extract, after being dried over anhydrous calcium sulfate (Drierite), was adjusted to pH 2 with 5 N alcoholic hydrogen chloride and then evaporated under reduced pressure. Addition of ethyl acetate to the residual oil caused crystallization. The cooled mixture was filtered, giving 57 grams of colorless crystals of 1-carbobenzoxy-4-n-propylpiperazine hydrochloride, melting at 158–159° C. Recrystallization from toluene-acetone-ethanol gave colorless crystals melting at 162–163° C.

Example X

A solution of 2.2 g. of 1-carbobenzoxypiperazine and 0.88 g. of redistilled propionaldehyde was shaken with hydrogen in the presence of 220 mg. of Adams' platinum catalyst at atmospheric pressure until the theoretical amount of hydrogen had been taken up. After removal of the catalyst by filtration the solvent was removed by evaporation under reduced pressure. The residual yellow oil, 2.5 g., was dissolved in ether and acidified with ethanolic hydrogen chloride. Filtration gave 2.5 g. of tan crystals of 1-carbobenzoxy-4-n-propylpiperazine which when recrystallized from absolute ethanol gave 800 mg. of colorless crystals, M. P. 161.5–162.5° C.

Example XI

A solution of 18 grams of 1-carbobenzoxy-4-n-propylpiperazine hydrochloride in 70 ml. of water was adjusted to pH 11 with 6.5 ml. of 10 N sodium hydroxide, and the alkaline solution was extracted with three 75 ml. portions of benzene. The combined benzene extracts were dried over anhydrous calcium sulfate (Drierite), and the dried solution was evaporated under reduced pressure to yield 15.0 grams of 1-carbobenzoxy-4-n-propylpiperazine in the form of a residual oil.

Example XII

A solution of 44.0 grams of 1-carbobenzoxypiperazine and 45.6 grams of n-butyl p-toluenesulfonate in 150 ml. of benzene was refluxed for 5 days. The reaction mixture was then chilled and diluted with ether causing the product to crystallize. Filtration gave 52 grams of colorless crystals of 1-n-butyl-4-carbobenzoxypiperazinium p-toluenesulfonate, melting at 130–133° C. Recrystallization from ethyl acetate-ethanol gave colorless crystals melting at 139.5–140.5° C.

Example XIII

Forty grams of 1-n-butyl-4-carbobenzoxypiperazinium p-toluenesulfonate were slurried with 150 ml. of water and 100 ml. of benzene while adding 10 N sodium hydroxide solution to pH 11. The 2 layers were separated, and the aqueous layer was extracted twice more with 100 ml. portions of benzene. The combined benzene extracts were dried over anhydrous calcium sulfate (Drierite) and evaporated under reduced pressure to give 24.6 grams of 1-n-butyl-4-carbobenzoxypiperazine, a colorless oil.

Example XIV 1-n-butyl-4-carbobenzoxypiperazinium p - toluenesulfonate, 65 g., was stirred with 100 ml. of water and 200 ml. of benzene while 30 ml. of 10 N sodium hydroxide was added. The upper organic layer was dried over anhydrous calcium sulfate (Drierite), acidified with alcoholic hydrogen chloride, and concentrated under reduced pressure. After chilling and filtering 39 g. of colorless crystals of 1-n-butyl-4-carbobenzoxypiperazine hydrochloride, M. P. 139–149° C., were obtained. Recrystallization from benzene and ethanol gave colorless crystals, M. P. 152° C.

Example XV

A solution of 55.1 grams of 1-carbobenzoxypiperazine 24.5 grams of cyclohexanone, and 14.4 grams of 88% formic acid was refluxed for 3 hours, by which time the evolution of carbon dioxide had ceased. To remove unreacted 1-carbobenzoxypiperazine, the reaction mixture was chilled and shaken with 100 ml. of benzene and 75 ml. of 5 N aqueous sodium hydroxide while adding 17.5 grams of benzoyl chloride in portions. After completion of the exothermic reaction, the benzene layer was removed, and the alkaline aqueous solution was extracted twice with 100 ml. portions of benzene. The combined benzene layers were extracted first with excess hydrochloric acid and then twice with 100 ml. portions of water. The combined aqueous acidic extracts were made strongly alkaline with 10 N aqueous sodium hydroxide and then extracted 3 times with 100 ml. portions of benzene. The combined benzene extracts were dried and then acidified with 5 N ethanolic hydrogen chloride. The acidified solution was concentrated to dryness under reduced pressure, and the residual solid was washed with ether to yield 32.5 grams of colorless crystals of 1-carbobenzoxy-4-cyclohexylpiperazine hydrochloride, melting at 179.5–183° C. Recrystallization from acetone-water gave 11.7 grams of product melting at 202–203° C. (solidifying and remelting on slow heating at 217–218° C.)

Example XVI 1-carbobenzoxy- 4 -cyclohexylpiperazine hydrochloride, 21.3 grams, was slurried with 70 ml. of water, and then 75 ml. of benzene and 7 ml. of 10 N sodium hydroxide were added, making the pH 11. After mixing, the benzene layer was separated, and the aqueous layer was extracted twice with 75 ml. portions of benzene. The combined benzene extracts were dried over anhydrous calcium sulfate (Drierite), and the dried solution was evaporated under reduced pressure to yield 17.6 grams of 1-carbobenzoxy-4-cyclohexylpiperazine in the form of a residual oil.

Example XVII

A stirred solution of 44.1 grams of 1-carbobenzoxypiperazine in 100 ml. of 50% ethanol was kept at 20° C. while a solution of 50 ml. of 4 N aqueous sodium hydroxide and 25.3 grams of benzyl chloride were added simultaneously from separate dropping funnels over the course of 10 minutes. After stirring the reaction mixture for an additional hour, the oily bottom layer was separated and dried with anhydrous calcium sulfate (Drierite). An ether solution of the dried oil was acidified with hydrogen chloride, yielding 45.1 grams of colorless crystals of 1-carbobenzoxy-4-benzylpiperazine hydrochloride, melting at 230° C. (dec.). Recrystallization from ethanol gave crystals melting at 222° C.

Example XVIII

To 11 grams of 1-carbobenzoxypiperazine, 5.3 grams of benzaldehyde was added with stirring and cooling. Then 24 grams of 88% formic acid was added. The mixture was refluxed until evolution of carbon dioxide ceased (5 days). The resulting solution was concentrated to dryness under reduced pressure, and the residue was dissolved in water. The aqueous solution was brought to pH 11 with sodium hydroxide and extracted with ether. The ether extract was dried first over solid sodium hydroxide and then with anhydrous calcium sulfate (Drierite). The hydrochloride was precipitated by adding alcoholic hydrogen chloride. Filtration gave 10.0 grams of colorless crystals melting at 198° C. (dec.). This material was recrystallized from isopropyl alcohol to yield colorless crystals of 1-carbobenzoxy-4-benzylpiperazine hydrochloride, melting at 210–211° C. (dec.).

*Example XIX*

A stirred mixture of 69.4 grams of 1-benzyl-4-carbobenzoxypiperazine hydrochloride, 400 ml. of water, and 200 ml. of benzene was made alkaline with 40 ml. of 10 N aqueous sodium hydroxide. The layers were separated, and the aqueous solution was re-extracted twice with 200 ml. portions of benzene. The combined benzene extracts were dried over anhydrous calcium sulfate (Drierite) and evaporated under reduced pressure. The yield of 1-carbobenzoxy-4-benzylpiperazine, a yellow oil, was 60.5 grams.

We claim:

1. Compounds having the general formula:

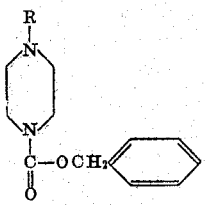

wherein R is a member selected from the group consisting of lower alkyl, benzyl, and cyclohexyl radicals, and therapeutically useful acid addition salts thereof.

2. The 1-carbobenzoxy-4-lower-alkylpiperazines.
3. 1-carbobenzoxy-4-n-butylpiperazine.
4. The 1-carbobenzoxy-4-lower-alkylpiperazinium p-toluene-sulfonates.
5. 1-carbobenzoxy-4-methylpiperazinium p-toluenesulfonate.
6. The 1-carbobenzoxy-4-lower-alkylpiperazine hydrochlorides.
7. 1-carbobenzoxy-4-benzylpiperazine hydrochloride.
8. 1-carbobenzoxy-4-cyclohexylpiperazine hydrochloride.
9. A method for preparing compounds having the general formula:

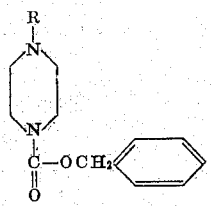

wherein R is a member selected from the group consisting of lower alkyl, benzyl, and cyclohexyl radicals, and therapeutically useful acid addition salts thereof, which comprises treating carbobenzoxypiperazine with a member selected from the group consisting of a lower alkyl aldehyde, benzyl aldehyde and cyclohexanone in the presence of a reducing agent selected from the group consisting of formic acid, hydrogen-platinum catalyst, and zinc-hydrochloric acid.

References Cited in the file of this patent

FOREIGN PATENTS 495,129  Belgium _____ Apr. 29, 1950